United States Patent

Billingham et al.

[11] Patent Number: 6,101,841
[45] Date of Patent: Aug. 15, 2000

[54] CRYOGENIC RECTIFICATION SYSTEM WITH HIGH STRENGTH AND HIGH CAPACITY PACKING

[75] Inventors: John Fredric Billingham, Getzville; Michael James Lockett, Grand Island, both of N.Y.

[73] Assignee: Praxair Technology, Inc., Danbury, Conn.

[21] Appl. No.: 09/165,110

[22] Filed: Oct. 2, 1998

[51] Int. Cl.[7] .............................. F25J 5/00; B01D 47/00
[52] U.S. Cl. .......................... 62/643; 62/903; 261/112.2
[58] Field of Search ............... 62/643, 907, 924; 261/112.2

[56] References Cited

U.S. PATENT DOCUMENTS

| | | | |
|---|---|---|---|
| 4,838,913 | 6/1989 | Victor et al. | 62/22 |
| 5,019,144 | 5/1991 | Victor et al. | 62/22 |
| 5,100,448 | 3/1992 | Lockett et al. | 62/24 |
| 5,237,823 | 8/1993 | Cheung et al. | 62/36 |
| 5,282,365 | 2/1994 | Victor et al. | 62/22 |
| 5,632,934 | 5/1997 | Billingham et al. | 261/112.2 |
| 5,921,109 | 7/1999 | Billingham et al. | 62/643 |

*Primary Examiner*—William Doerrler
*Attorney, Agent, or Firm*—Stanley Ktorides

[57] ABSTRACT

A cryogenic rectification system and a packing module and column suitable for cryogenic rectification having packing sheets with top and bottom modifications in alternating sequence and preferably having top and bottom edges terminating in planes wherein capacity and mass transfer efficiency is enhanced and mechanical strength is not compromised.

8 Claims, 4 Drawing Sheets

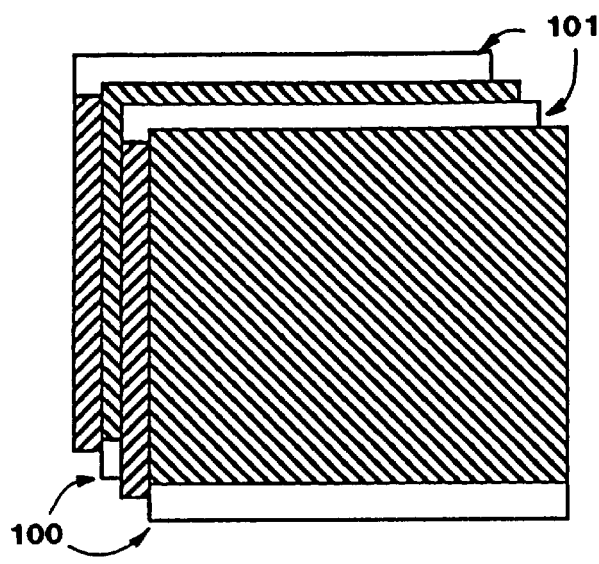
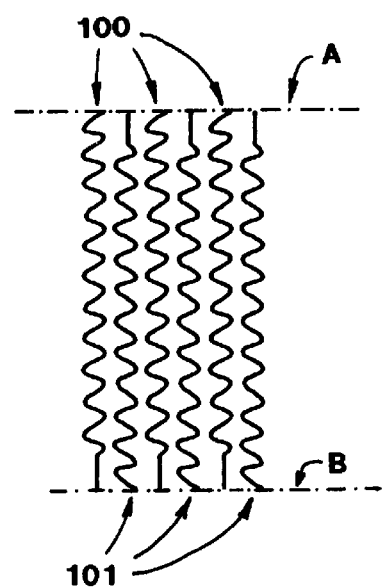
Fig. 3A  Fig. 3B
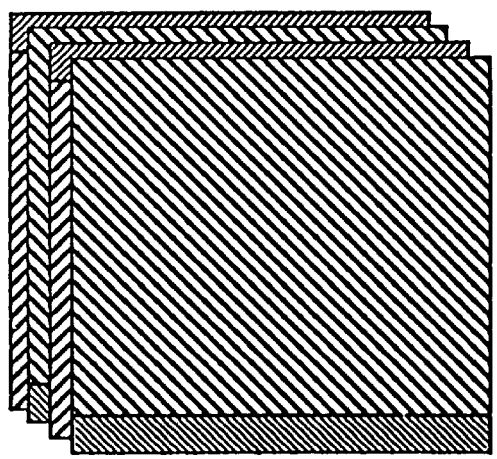
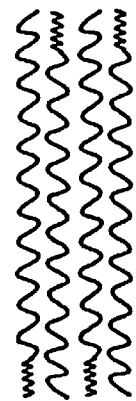
Fig. 4A  Fig. 4B

CRYOGENIC RECTIFICATION SYSTEM WITH HIGH STRENGTH AND HIGH CAPACITY PACKING

TECHNICAL FIELD

This invention relates to rectification of a multicomponent mixture, particularly to cryogenic rectification, and to the use of structured packing as column internals for carrying out the rectification.

BACKGROUND ART

Distillation of a fluid mixture, e.g. air, into two or more portions enriched in a respective mixture component has generally been carried out employing one or more distillation or rectification columns which employ trays as the column internals or mass transfer elements. Recently there has developed an increasing use of structured packing as mass transfer elements in rectification columns because structured packing has a much lower pressure drop than does trays.

While structured packing has advantages over conventional trays in the operation of a distillation column, the cost of the packing is generally higher than that of the trays. The volume of packing required to effect a separation depends on the packing height and the column diameter. The latter is set by the capacity of the packing or equivalently by the flooding point wherein gas or vapor and liquid no longer effectively flow in countercurrent contact.

There has been developed structured packing which has increased capacity enabling increased column throughput before reaching flood conditions but such packing is generally characterized by having poor mechanical strength making it vulnerable to damage which compromises the increase in capacity.

Accordingly it is an object of this invention to provide a rectification system which utilizes structured packing which has higher capacity and also has higher mechanical strength than does heretofore available structured packing useful in rectification systems.

SUMMARY OF THE INVENTION

The above and other objects, which will become apparent to one skilled in the art upon a reading of this disclosure, are attained by the present invention, one aspect of which is:

A method for carrying out cryogenic rectification comprising:

(A) passing a feed comprising at least two components including a first more volatile component and a second less volatile component into a column;

(B) carrying out countercurrent vapor liquid contact within the column, said column containing a plurality of vertically stacked structured packing modules which comprise a plurality of first and second vertically oriented diagonally cross-corrugated packing sheets in alternating sequence, each first sheet having a modification at the bottom of that sheet and each second sheet having a modification at the top of the sheet;

(C) withdrawing a top fluid from the upper portion of the column, said top fluid having a concentration of first more volatile component which exceeds that of the feed; and (D) withdrawing a bottom fluid from the lower portion of the column, said bottom fluid having a concentration of second less volatile fluid which exceeds that of the feed.

Another aspect of the invention is:

A column having means for passing fluid into the column, means for withdrawing fluid from the upper portion of the column, means for withdrawing fluid from the lower portion of the column, and containing a plurality of vertically stacked structured packing modules which comprise a plurality of first and second vertically oriented diagonally cross-corrugated packing sheets in alternating sequence, each first sheet having a modification at the bottom of that sheet and each second sheet having a modification at the top of that sheet.

A further aspect of the invention is:

A structured packing module comprising a plurality of first and second vertically oriented diagonally cross-corrugated packing sheets in alternating sequence, each first sheet having a modification at the bottom of that sheet and each second sheet having a modification at the top of that sheet.

The term "column" as used herein means a distillation or fractionation column or zone, i.e. a contacting column or zone, wherein liquid and vapor phases are countercurrently contacted to effect separation of a fluid mixture, as, for example, by contacting of the vapor and liquid phases on packing elements. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13-3 *The Continuous Distillation Process*. Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is rectification carried out, at least in part, at temperatures below 150° K.

As used herein, the term "packing" means any solid or hollow body of predetermined configuration, size and shape used as column internals to provide surface area for the liquid to allow mass transfer at the liquid-vapor interface during countercurrent flow of the two phases.

As used herein, the term "structured packing" means diagonally cross-corrugated packing wherein individual members have specific orientation relative to each other and to the column axis.

As used herein, the terms "upper portion" and "lower portion" of a column mean those sections of the column respectively above and below the mid point of the column.

In the practice of this invention each module or brick has three regions: an altered region at the top portion, an unaltered region below the top altered region, and an altered region below the unaltered region. The module or brick comprises a plurality of first and second vertically oriented, diagonally cross-corrugated packing sheets in an alternating sequence. Each first sheet has a modification in the altered region at the top of that sheet and each second sheet has a modification in the altered region at the bottom of that sheet. As used herein the term "modification" means an alteration of the packing geometry that reduces the pressure drop associated with vapor passage through the altered region and thus eases the passage of liquid through and from the packing module or brick.

BRIEF DESCRIPTION OF THE DRAWINGS

FIGS. 3A and 3B illustrate in perspective and side views respectively one embodiment of structured packing sheets useful in the practice of the invention.

FIGS. 4A and 4B illustrate in perspective and side views respectively another embodiment of structured packing sheets useful in the practice of this invention.

DETAILED DESCRIPTION

Figure 1:
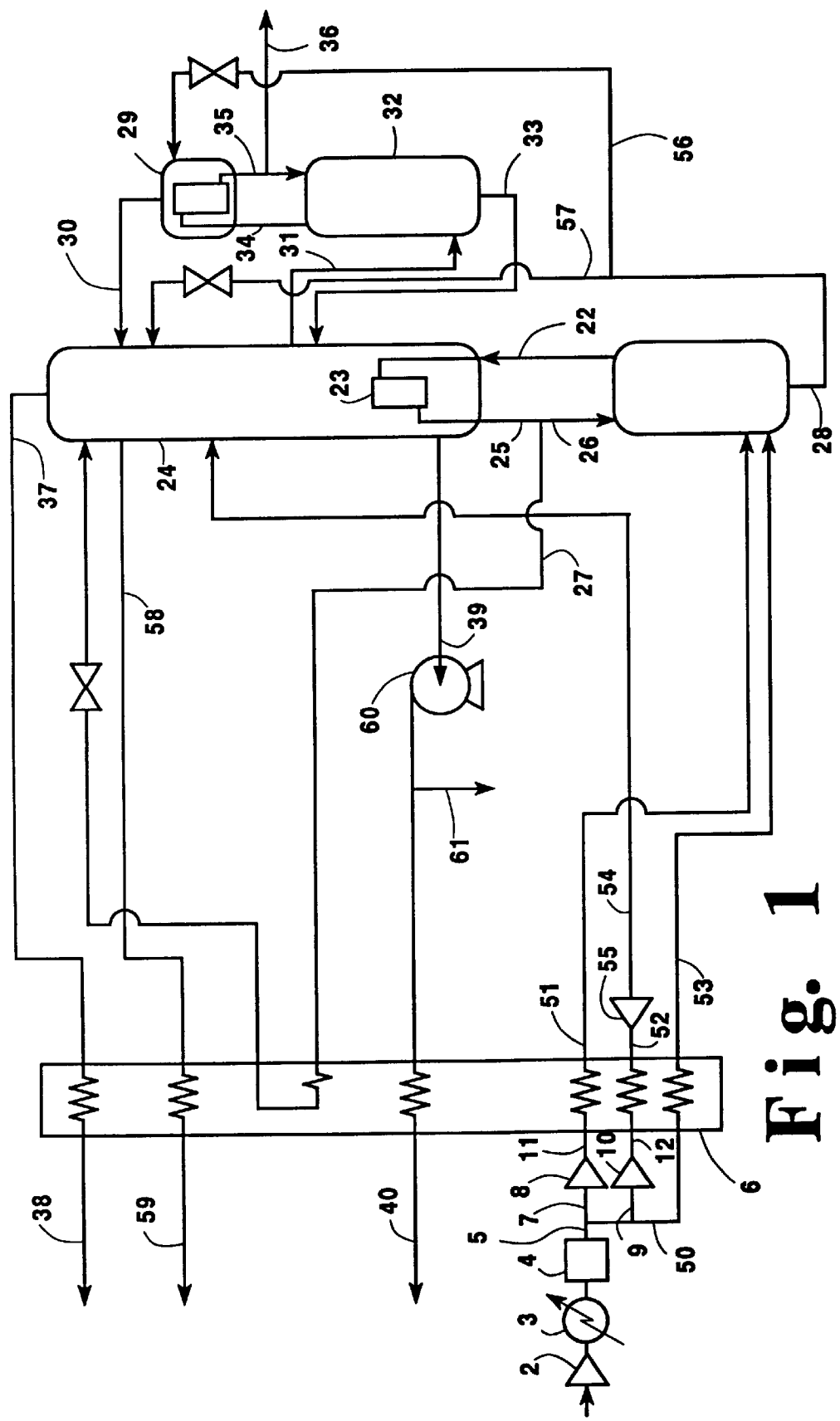
FIG. 1 is a schematic representation of one cryogenic rectification system which may be used in the practice of this invention.

The invention will be described in detail with reference to the Drawings. FIG. 1 illustrates one embodiment of a rectification system wherein the high strength structured packing modules of the invention may be employed. The particular system illustrated in FIG. 1 is a cryogenic air separation plant which comprises a double column and an argon sidearm column.

Referring now to FIG. 1, feed air 1 comprising primarily nitrogen, oxygen and argon is compressed in compressor 2 and cooled of the heat of compression by passage through cooler 3. The pressurized feed air is then cleaned of high boiling impurities such as water vapor, carbon dioxide and hydrocarbons by passage through purifier 4 which is typically a temperature or a pressure swing adsorption purifier. Cleaned, compressed feed air 5 is then cooled by indirect heat exchange with return streams in primary heat exchanger 6. In the embodiment illustrated in FIG. 1, a first portion 7 of feed air 5 is further compressed by passage through booster compressor 8, a second portion 9 is further compressed by passage through booster compressor 10, and resulting further compressed feed air portions 11 and 12 and remaining compressed feed air portion 50 are cooled by passage through primary heat exchanger 6 to produce compressed, cleaned and cooled feed air, in streams 51, 52, and 53 respectively. Stream 52 is turboexpanded to form stream 54 by passage through turboexpander 55 to generate refrigeration for the subsequent cryogenic rectification and then passed into lower pressure column 24. Streams 51 and 53 are each passed as feed streams into higher pressure column 21.

Within higher pressure column 21 the feed air is separated by cryogenic rectification into nitrogen-enriched vapor and oxygen-enriched liquid. Nitrogen-enriched vapor is passed in stream 22 into main condenser 23 wherein it is condensed by indirect heat exchange with lower pressure column 24 bottom liquid to form nitrogen-enriched liquid 25. A portion 26 of nitrogen-enriched liquid 25 is returned to higher pressure column 21 as reflux, and another portion 27 of nitrogen-enriched liquid 25 is subcooled in heat exchanger 6 and then passed into lower pressure column 24 as reflux. Oxygen-enriched liquid is passed from the lower portion of higher pressure column 21 in stream 28 and a portion 56 is passed into argon column top condenser 29 wherein it is vaporized by indirect heat exchange with argon-richer vapor, and the resulting oxygen-enriched fluid is passed as illustrated by stream 30 from top condenser 29 into lower pressure column 24. Another portion 57 of the oxygen-enriched liquid is passed directly into lower pressure column 24.

A stream 31 comprising oxygen and argon is passed from lower pressure column 24 into argon column 32 wherein it is separated by cryogenic rectification into argon-richer vapor and oxygen-richer liquid. The oxygen-richer liquid is returned to lower pressure column 24 in stream 33. The argon-richer vapor is passed in stream 34 into top condenser 29 wherein it condenses by indirect heat exchange with the vaporizing oxygen-enriched liquid as was previously described. Resulting argon-richer liquid is returned in stream 35 to argon column 32 as reflux. Argon-richer fluid, as vapor and/or liquid, is recovered from the upper portion of argon column 32 as product argon in stream 36.

Lower pressure column 24 is operating at a pressure less than that of higher pressure column 21. Within lower pressure column 24 the various feeds into the column are separated by cryogenic rectification into nitrogen-rich fluid and oxygen-rich fluid. Nitrogen-rich fluid is withdrawn from the upper portion of lower pressure column 24 as vapor stream 37, warmed by passage through primary heat exchanger 6 and recovered as product nitrogen 38. A waste stream 58 is withdrawn from the upper portion of lower pressure column 24, warmed by passed through heat exchanger 6 and removed from the system in stream 59. Oxygen-rich fluid is withdrawn from the lower portion of lower pressure column 24 as vapor and/or liquid. If withdrawn as a liquid, the oxygen-rich liquid may be pumped to a higher pressure and vaporized either in a separate product boiler or in primary heat exchanger 6 prior to recovery as high pressure product oxygen. In the embodiment illustrated in FIG. 1 oxygen-rich fluid is withdrawn from lower pressure column 24 as liquid stream 39, pumped to a higher pressure through liquid pump 60, vaporized by passage through primary heat exchanger 6 and recovered a product oxygen 40. A portion 61 of the liquid oxygen may be recovered as liquid.

Figure 2:
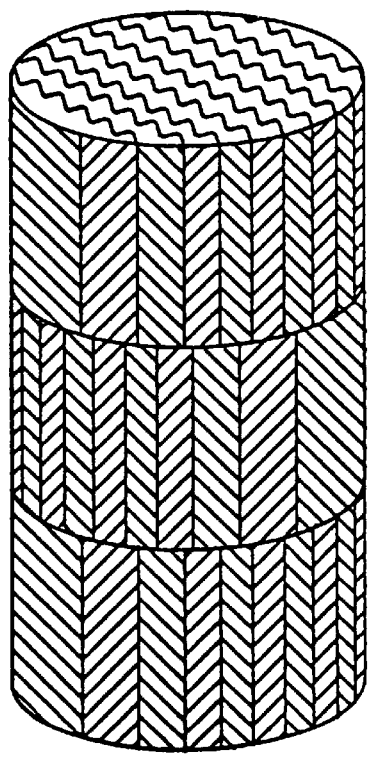
FIG. 2 illustrates a plurality of vertically stacked structured packing modules as they would be oriented within a column and wherein the diameter of the modules is the same as the column diameter. In other cases the modules are built in sections which are put together to cover the column cross-section.

At least one of the columns contains a plurality of vertically stacked structured packing bricks or modules, for example, as illustrated in FIG. 2. Each such brick or module comprises vertically oriented structured packing sheets with corrugations at an angle to the vertical axis. Sheets are arranged such that the corrugation direction of adjacent sheets is reversed. The packing is installed in the column as layers which are generally between 6 and 12 inches in height. Adjacent layers are rotated around a vertical axis to enhance mixing. The complete packed bed of a column comprises multiple layers of the packing, the number of layers being set by the height of packing required to perform the separation. The column may also contain other types of structured packing and/or trays. The packing corrugations are characterized by a crimp height. The corrugation profile may be sharp (saw-tooth) or rounded (sinusoidal). The sheets touch each other at contact points along the peaks and valleys of the corrugations.

FIGS. 3A and 3B illustrate one embodiment of packing sheets which may be used in the practice of this invention. In FIGS. 3A and 3B there are shown a plurality of first packing sheets 100 having a modification at the bottom and a plurality of second packing sheets 101 having a modification at the top. In this case the modification is a reduction in the crimp height of the packing to zero so that the packing is flat at the modification. This packing was made by flattening a small region of the sheets either at their bottom or at their top alternately. The sheets which were flattened at the bottom had an uneven lower edge as a result of the manufacturing process and this is believed to be beneficial in providing a multitude of drip points from those sheets. The first packing sheets 100 have no modification at the top and the second packing sheets 101 have no modification at the bottom. Preferably, all of the packing sheets terminate in a plane A at their top edge and, most preferably, in another plane B at their bottom edge, such planes being horizontal when the sheets are oriented vertically. While it is preferred that the first and second sheets strictly alternate, i.e. that, other than for the end sheets, a first sheet is always between two second sheets and a second sheet is always between two first sheets, it is understood that some departure from strict alternation is allowable. That is, the term "alternating sequence" may encompass one or more instances where first sheets are adjacent one another and/or second sheets are adjacent one another.

FIGS. 4A and 4B illustrate another embodiment of the packing sheets which may be used in the practice of this invention. The sheets illustrated in FIGS. 4A and 4B differ from those illustrated in FIGS. 3A and 3B in that the crimp height is reduced, but not reduced to zero, for the modification.

Figure 5:
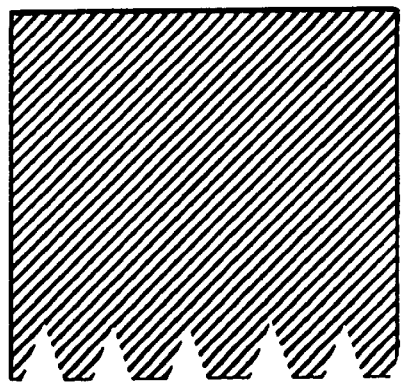
FIGS. 5–7 each illustrate in front view other embodiments of a packing sheet which may be used in the practice of this invention.
Figure 6:
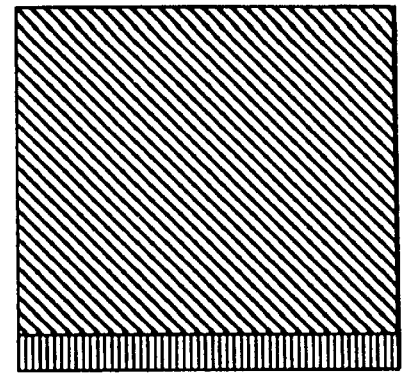
Figure 7:
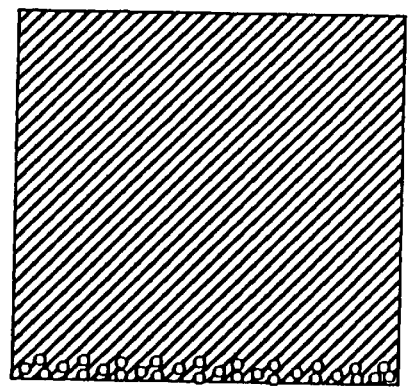

FIGS. 5, 6 and 7 each illustrate a front view of one representative packing sheet having a different modification than those illustrated in the previously discussed Drawings. In FIG. 5 there is illustrated a packing sheet having a modification comprising notches, in FIG. 6 there is illustrated a packing sheet having a modification wherein the corrugations are at an increased angle of inclination, and in FIG. 7 there is illustrated a packing sheet having a modification comprising holes in the sheet.

Figure 8A:
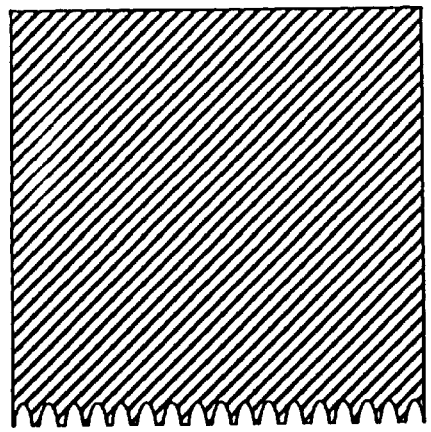
FIGS. 8A and 8B illustrate in perspective and side views respectively yet another embodiment of the structured packing sheets useful in the practice of this invention.
Figure 8B:
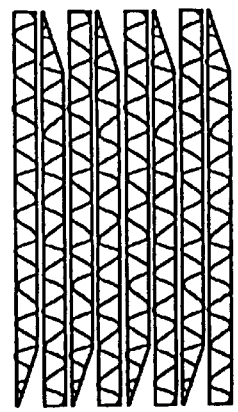

FIGS. 8A and 8B illustrate another embodiment of the packing sheets which may be used in the practice of this invention. In FIG. 8A there is illustrated a packing sheet that has been cut at an angle other than 90 degrees to the plane of the sheet. This is illustrated more clearly by the side view of a plurality of such sheets shown in FIG. 8B.

The modifications at the tops and bottoms of the packing sheets in each module reduce the pressure drop associated with vapor passage through the modified regions of the packing module or brick and thus ease the passage of liquid through and from the module or brick, countering potential flooding and providing increased capacity. The alternating sequence of the modifications improves the mechanical strength of the packing over other high capacity packings known in the art where modifications are made to the bottom of all the packing sheets.

Although the invention has been described in detail with reference to certain preferred embodiments, those skilled in the art will recognize that there are other embodiments of the invention within the spirit and the scope of the claims. For example, although the invention was discussed in detail with reference to cryogenic rectification, such as the rectification of air or a mixture comprising oxygen and argon discussed with reference to FIG. 1, it is understood that the invention may be employed to carry out other rectification processes such as, for example, oil fractionations, hydrocarbon separations and alcohol distillations. The modifications at the tops and bottoms of the packing sheets need not be the same type modifications for all of the sheets. The modification used in the top altered region may be different from the modification used in the bottom altered region of the sheets.

What is claimed is:

1. A method for carrying out cryogenic rectification comprising:

(A) passing a feed comprising at least two components including a first more volatile component and a second less volatile component into a column;

(B) carrying out countercurrent vapor liquid contact within the column, said column containing a plurality of vertically stacked structured packing modules which comprise a plurality of first and second vertically oriented diagonally cross-corrugated packing sheets in alternating sequence, each first sheet having a modification at the bottom of that sheet and each second sheet having a modification at the top of that sheet and wherein the top edges of all the first and second sheets of a module form a horizontal plane;

(C) withdrawing a top fluid from the upper portion of the column, said top fluid having a concentration of first more volatile component which exceeds that of the feed; and (D) withdrawing a bottom fluid from the lower portion of the column, said bottom fluid having a concentration of second less volatile fluid which exceeds that of the feed.

2. The method of claim 1 wherein the first more volatile component of the feed is nitrogen and the second less volatile component of the feed is oxygen.

3. The method of claim 1 wherein the first more volatile component of the feed is argon and the second less volatile component of the feed is oxygen.

4. The method of claim 1 wherein the bottom edges of all the first and second sheets of a module form a first horizontal plane and the top edges of all the first and second sheets of a module form a second horizontal plane.

5. A column having means for passing fluid into the column, means for withdrawing fluid from the upper portion of the column, means for withdrawing fluid from the lower portion of the column, and containing a plurality of vertically stacked structured packing modules which comprise a plurality of first and second vertically oriented diagonally cross-corrugated packing sheets in alternating sequence, each first sheet having a modification at the bottom of that sheet and each second sheet having a modification at the top of that sheet and wherein the top edges of all of the first and second sheets of a module form a horizontal plane.

6. The column of claim 5 wherein the bottom edges of all the first and second sheets of a module form a first horizontal plane and the top edges of all the first and second sheets of a module form a second horizontal plane.

7. A structured packing module comprising a plurality of first and second vertically oriented diagonally cross-corrugated packing sheets in alternating sequence, each first sheet having a modification at the bottom of that sheet and each second sheet having a modification at the top of that sheet and wherein the top edges of all the first and second sheets form a horizontal plane.

8. The module of claim 7 wherein the bottom edges of all the first and second sheets form a first horizontal plane and the top edges of all the first and second sheets form a second horizontal plane.

* * * * *